No. 742,415. PATENTED OCT. 27, 1903.
H. S. HALE.
APPARATUS FOR SUPPLYING FOOD TO FISH OR LAND ANIMALS.
APPLICATION FILED FEB. 28, 1903.
NO MODEL.
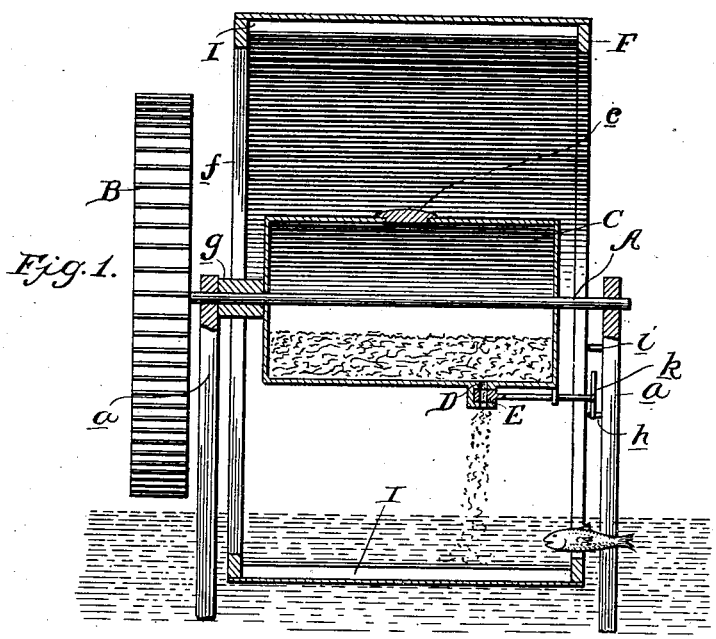
Fig. 1.
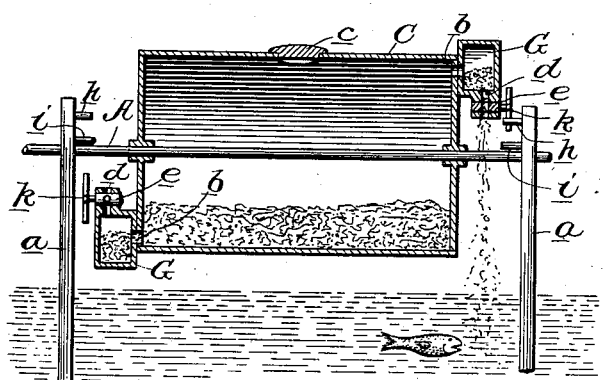
Fig. 2.
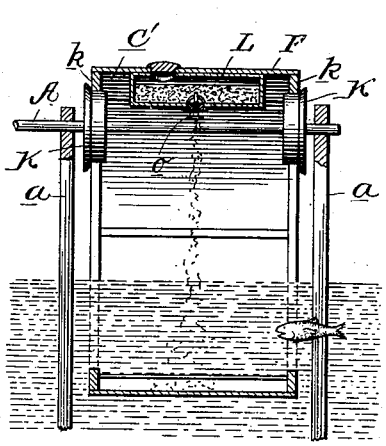
Fig. 3.
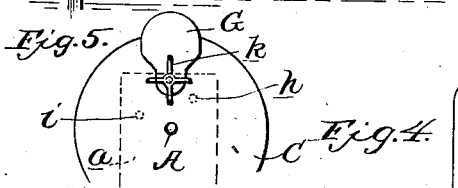
Fig. 5.
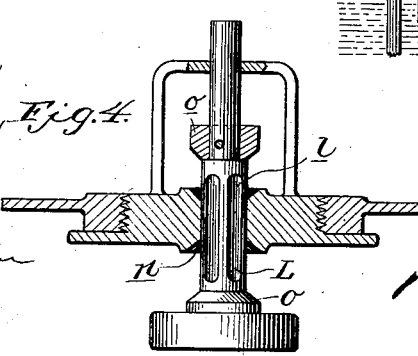
Fig. 4.
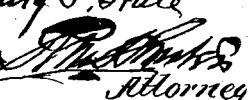
Witnesses
E. C. Wurdeman
R. M. Kelly
Inventor
Henry S. Hale
By _____
Attorney No. 742,415. Patented October 27, 1903.

UNITED STATES PATENT OFFICE.

HENRY S. HALE, OF PHILADELPHIA, PENNSYLVANIA.

APPARATUS FOR SUPPLYING FOOD TO FISH OR LAND-ANIMALS.

SPECIFICATION forming part of Letters Patent No. 742,415, dated October 27, 1903.

Application filed February 28, 1903. Serial No. 145,462. (No model.)

*To all whom it may concern:*

Be it known that I, HENRY S. HALE, of the city and county of Philadelphia, State of Pennsylvania, have invented an Improvement in Apparatus for Supplying Food to Fish or Land-Animals, of which the following is a specification.

My invention relates to apparatus for supplying feed to fish and land-animals, and is fully set forth in the following specification and shown in the accompanying drawings.

In feeding fish, poultry, &c., it is especially desirable that a uniform quantity of feed should be supplied in a given period of time. In large fish and poultry hatcheries much time and labor are consumed in supplying the feed, and a uniform supply cannot be obtained under present methods without constant care and attention on the part of the attendants. In pisciculture especially great care must be exercised, and the quantity, as well as the character, of the feed must be regulated to suit the size and species of the young fish.

It is the object of my invention to provide mechanical devices for supplying the feed at the feeding beds or inclosures without requiring the constant attention of the attendants.

It is also an object of my invention to provide an apparatus which when supplied with a quantity of feed of the proper quality will supply the same in predetermined and uniform quantities. Such apparatus may be operated by hand to supply a measured quantity of feed at given intervals or may be driven by suitable power devices to maintain a uniform supply of feed in measured quantities and at uniform intervals without requiring any attention from the attendants except to see that the feed-supply in the apparatus is not exhausted.

In carrying out my invention I employ a rotary feed-receptacle, in combination with means for intermittently discharging a portion of the feed therefrom, whereby at regular intervals or as often as the apparatus may be operated by hand, if hand-power is relied upon, a measured quantity of feed will be discharged therefrom. The means for discharging the measured quantity of feed intermittently from the receptacle preferably consists of an intermittently-operated valve controlling the discharge-outlet, and this valve may be operated either automatically or positively by suitable stops or valve-actuating devices.

Another part of my invention embraces the combination, with a feed-receptacle, of a measuring-chamber communicating therewith and receiving a measured quantity of feed therefrom, from which the feed is discharged at intervals.

In fish-feeding it is desirable that the feed should not be allowed to fall and remain upon the bottom, and to prevent this I employ, in combination with the receptacle from which the feed is discharged, a slowly-rotating feed-receiver, which receives the fallen feed and carries it up out of the water and drops it again therein.

The feed supplied may be of any suitable character. That used in pisciculture is usually mixed with water and flows readily.

For purposes of illustration I have shown my invention as especially employed for fish-feeding; but I do not mean to limit myself to such use of my invention, as it is obvious that it might be employed for feeding poultry, &c., in which case, however, the rotary receiver for picking up and again dropping the feed would not ordinarily be used.

In the accompanying drawings, Figure 1 is a longitudinal vertical sectional view of a feeding apparatus embodying my invention. Figs. 2 and 3 are similar views illustrating modifications. Fig. 4 is an enlarged detail view of the gravity-actuated valve shown in Fig. 3; and Fig. 5 is an end view of part of the apparatus shown in Fig. 2, showing the valve-operating devices thereof.

A is a shaft journaled in suitable bearings *a a* and driven in any suitable manner, as by a water-wheel, Fig. 1.

Referring first to the construction shown in Fig. 1, C is a closed feed chamber or vessel carried by the shaft A and adapted to contain a quantity of feed, which may be introduced through a supply-aperture *c*. D is an outlet from the chamber C for the discharge of feed, which is controlled by a suitable valve E. This valve may be operated automatically or by any positive valve-actuating devices. In the construction shown in Figs. 1 and 2 the discharge-valve is a rotary valve carried by a stem provided on its end with a star-wheel $k$, adapted to strike appropriately-disposed pins or projections $h$ $i$, the pin $h$ acting to open the valve and the pin $i$ to close it in the manner well known.

In fish-feeding it is desirable that the feed should not be allowed to fall and remain upon the bottom, and I prefer, when my feed measuring and supplying apparatus is used for this purpose, to employ an open receptacle or vessel, more or less submerged in the water, into which the feed may fall and by the movement of which such particles of feed as may accumulate at the bottom of the receptacle may be raised and dropped again into the water. As shown, this receptacle or vessel consists of a drum F, carried by the shaft A and inclosing the feed-chamber C. The drum F is open at one or both ends and in the construction shown in Fig. 1 is provided at one end with arms $f$, carrying the hub $g$ on the shaft A. The drum F is partly submerged in the water, and as the shaft A rotates and the valve E is opened to discharge a given quantity of feed the discharged feed falls into the water, and such as is not taken by the fish and accumulates upon the bottom of the drum is carried up as the drum rotates and is dropped again into the water. For this purpose the interior of the drum is roughened or provided with one or more ribs or flanges I.

In the construction shown in Fig. 2 the feed receptacle or chamber C is similar to that shown in Fig. 1, except that instead of the discharge-opening D leading directly from the chamber I employ one or more measuring-compartments G, communicating with the chamber C through supply-openings $b$, through which a limited quantity of feed may pass from the supply-chamber C into the measuring-compartment. The measuring-compartment is provided with a discharge-outlet $d$, controlled by a valve $e$, which is operated to open when the measuring-compartment has been moved into position to discharge its contents, as shown at the right-hand side in Fig. 2. In the construction shown the valves $e$ are operated by star-wheels and stops $h$ $i$, as in the case of Fig. 1. Automatic valves may, however, be employed, as shown in Figs. 3 and 4. With this construction on each revolution of the shaft A and chamber C a measured quantity of feed passes into the measuring-compartments G and is discharged. I have shown two measuring-compartments G; but one or more may be employed. In this construction I have not shown the outer vessel or drum for catching and raising and dropping the feed; but such device may of course be used.

It is desirable that the outer vessel or drum when employed should rotate slowly, and to impart to said drum a slow movement relatively to the shaft A the construction shown in Fig. 3 may be employed. For this purpose the drum is supported by its annular inturned flanges $k$ upon flanged wheels K K, carried by the shaft A, which as the shaft A rotates will impart a relatively slow rotary movement to the drum F.

Instead of employing a feed-holder such as C, carried by the shaft A, the feed-holder C' may be carried by the rotary drum F, as shown in Fig. 3.

Instead of positively-actuated valves, such as are shown in Figs. 1 and 2, an automatic valve may be employed, and I have shown such a valve in Fig. 4 and have illustrated its application to the food-carrying chamber in Fig. 3. Automatic valves suitable for this purpose are well known, and any suitable form may be employed; but in Figs. 3 and 4 I have shown a special measuring-valve, in which the weighted stem L fits an opening $n$ in the receptacle and is recessed or reduced, as at $l$, so as to form a chamber within the valve-stem for the feed. The stem is provided at opposite sides of the opening $n$ with valve-pieces $o$ $o$, adapted to seats about the opening $n$. When the valve is partially opened, the feed will pass through the passage $l$; but when the valve is fully elevated the inner piece $o$ will close upon the inner seat at the opening $n$ by reason of the weight of the stem L and further escape of feed will be prevented.

The details of construction may be varied without departing from the invention.

What I claim as new, and desire to secure by Letters Patent, is as follows:

1. In a feed measuring and supplying apparatus, the combination of a rotary receptacle for a quantity of feed, and means for intermittently discharging a portion of feed therefrom.

2. In a feed measuring and supplying apparatus, the combination of a rotary receptacle for a quantity of feed, provided with a feed-discharging outlet, and an intermittently-operated valve to control said outlet.

3. In a feed measuring and supplying apparatus, the combination of a receptacle for a quantity of feed, a measuring-chamber communicating therewith and adapted to receive a measured quantity of feed therefrom, and means for intermittently discharging the feed from said measuring-chamber.

4. In a feed measuring and supplying apparatus, the combination of a receptacle for a quantity of feed, a measuring-chamber communicating therewith and adapted to receive a measured quantity of feed therefrom, and an intermittently-operated valve to control the discharge of feed from said measuring-chamber.

5. In a feed measuring and supplying apparatus, the combination of a rotary receptacle for a quantity of feed, means for intermittently discharging a portion of feed therefrom, and a rotary feed-receiver arranged to receive the discharged feed.

6. In a feed measuring and supplying apparatus, the combination of a rotary receptacle for a quantity of feed, a rotary feed-receiver inclosing said feed-receptacle, and means for intermittently discharging a portion of the feed from said receptacle within the rotary feed-receiver.

In testimony of which invention I have hereunto set my hand.

HENRY S. HALE.

Witnesses:
ERNEST HOWARD HUNTER,
R. M. KELLY.